United States Patent
Adam

(10) Patent No.: US 6,749,350 B2
(45) Date of Patent: Jun. 15, 2004

(54) METHOD AND SYSTEM FOR PROCESSING A PHOTOGRAPHIC FILM

(75) Inventor: Henry H. Adam, Leighton Buzzard (GB)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/267,457

(22) Filed: Oct. 9, 2002

(65) Prior Publication Data

US 2004/0071461 A1 Apr. 15, 2004

(30) Foreign Application Priority Data

Oct. 20, 2001 (GB) .............................. 0125229

(51) Int. Cl.$^7$ ................................. G03D 3/02
(52) U.S. Cl. .................... 396/567; 570/626; 355/27
(58) Field of Search ................. 396/567–570, 396/620, 626; 355/27–29; 134/64 P, 64 R

(56) References Cited

U.S. PATENT DOCUMENTS

| 4,965,626 A | 10/1990 | Robison et al. |
| 5,130,745 A | 7/1992 | Cloutier et al. |
| 5,229,810 A | 7/1993 | Cloutier et al. |
| 5,323,204 A | 6/1994 | Wheeler et al. |
| 5,701,530 A | 12/1997 | Fujino |
| 5,745,811 A | 4/1998 | Okino et al. |
| 2002/0061195 A1 | 5/2002 | Twist et al. |
| 2003/0156838 A1 * | 8/2003 | Ikeda et al. .................. 396/564 |

FOREIGN PATENT DOCUMENTS

| EP | 0 596 347 A | 5/1994 |
| JP | 04-275548 | 10/1992 |
| JP | 09-034093 | 2/1997 |

* cited by examiner

*Primary Examiner*—D. Rutledge
(74) *Attorney, Agent, or Firm*—Milton S. Sales

(57) ABSTRACT

The present invention relates to a camera including a writer adapted to couple information to a film in use in the camera, the information relating to an ISO rating setting for a particular image captured by the camera. The invention also relates to photographic processing system, comprising reading means to identify from magnetic information stored on a film to be processed the ISO rating setting at which images on the film were captured and a developer stage to receive the film to be developed. The photographic processing system also includes a control unit to select a development time for the film in dependence on the identified ISO rating setting. The invention enables optimisation of image quality to be achieved.

14 Claims, 2 Drawing Sheets

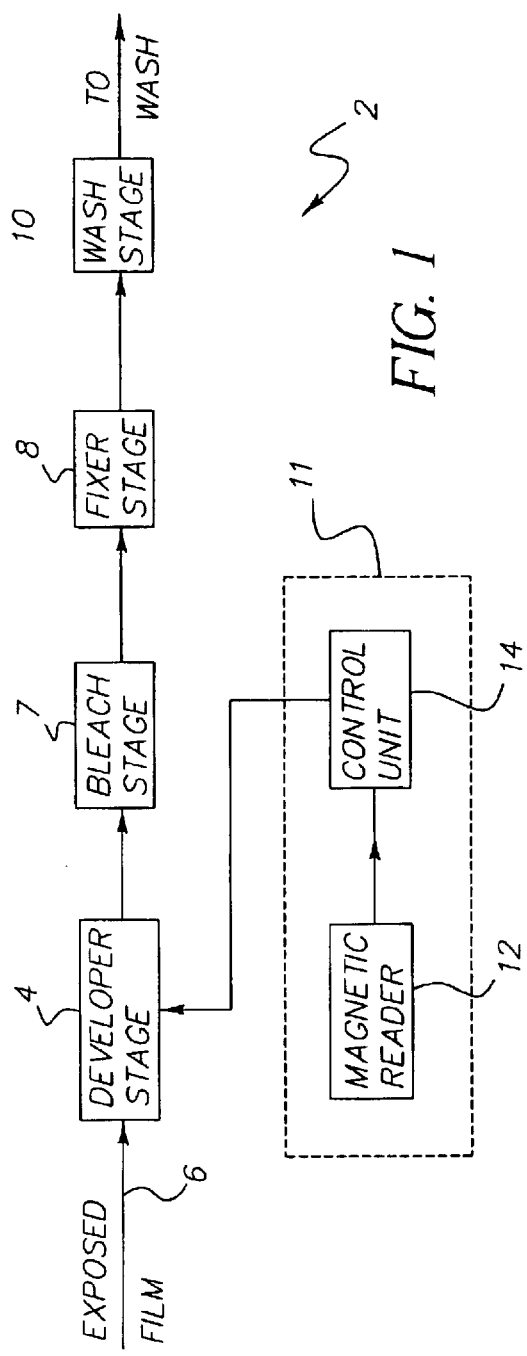
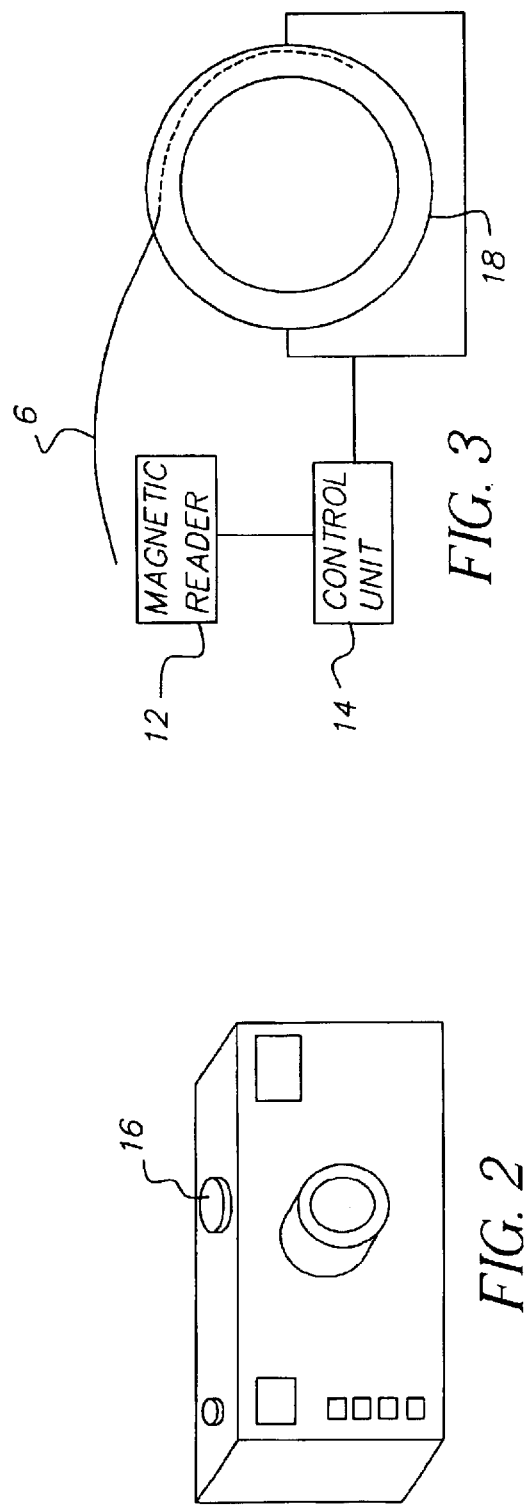

METHOD AND SYSTEM FOR PROCESSING A PHOTOGRAPHIC FILM

FIELD OF THE INVENTION

The present invention relates to a method and system for processing a photographic film and in particular to a method and system for processing a photographic film that enables optimisation of images obtained from the film. The invention also relates to a camera that enables optimisation of captured images.

BACKGROUND OF THE INVENTION

The ISO rating of a film defines the speed of the film, which allows the camera or photographer to choose a combination of aperture and shutter speed to give optimum exposure. In conventional camera systems, the ISO rating of the film used in the camera is conveyed to the camera via DX coding or other suitable means, such as in the APS system or manually set by the photographer. This is done in anticipation that the film will be processed in a standard process such as the Kodak C41 industry standard process or an equivalent having a specified development time. Processing systems running such processes are fixed in development time by a combination of path-length through the developer tank of the processing system and transport speed of the film as it passes through the developer tank.

Novel processing systems have been developed which use a single tank and batch chemistry rather than tank chemistry, with removal of spent chemicals prior to injection into the processor of the subsequent chemistry stage. The system disclosed in U.S. Patent Application Publication No. 2002/0061195, published May 23, 2002 in the name of Eastman Kodak Company, is an example of such a processing system. This system uses a cylindrical rotating tank in which a roller urges a wave of chemicals over the surface of a film being processed as the cylindrical tank rotates. The development time in such a processing system is not fixed like the development time in tank processors. Indeed, the development time can vary substantially and is controlled by software, which decides when to remove developer and replace it with the next chemistry, such as a bleaching agent. U.S. Pat. No. 5,323,204 discloses an exposure control apparatus and various accompanying methods for improving the overall quality of photographic images. The quality improvement is attained through user selection of a desired display size and/or focal length photographing mode for each image to be captured followed by an optimisation, for that size and mode, of various photographic parameters.

PROBLEM TO BE SOLVED BY THE INVENTION

A problem exists in that sometimes a camera is used in situations when a different ISO rating would be preferable to the one that the film in use in the camera has been designed for. In such situations it is desirable to use a different ISO rating setting to capture an image, but if this is done, when the film is processed using a conventional processing method and system, the processing is not optimised and image quality is degraded.

A method and system is required that enables the image quality of output images from the system to be optimised.

A camera is also required that provides a user with the ability to select an ISO rating setting for use with a film to ensure optimisation of captured images without adversely affecting the quality of the processed images obtained from the film.

SUMMARY OF THE INVENTION

According to a first aspect of the present invention, there is provided a camera adapted to couple data such as magnetic information to a film in use in the camera, the data relating to an ISO rating setting for the whole film or the ISO rating setting for a particular image captured by the camera.

Preferably, the camera further comprises user operable selection means to enable a user to select a desired ISO rating setting for the film.

More preferably, the user operable selection means comprises a dial arranged on the camera-casing, selectively rotatable between a plurality of predetermined positions each of the positions corresponding to a predetermined ISO rating setting. Any other suitable user operable selection means could also be used. For example, a Liquid Crystal Display arranged on the camera casing in combination with a toggle switch could be used.

According to a second aspect of the present invention there is provided a photographic processing system comprising reading means to identify from magnetic information stored on a film to be processed the ISO rating setting at which images on the film were captured.

The system includes a developer stage to receive the film to be developed and a control unit to select a development time for the film in dependence on the identified ISO rating setting. The reading means includes a magnetic detector to read the magnetic information stored on the film and provide an identification signal indicative of the ISO rating setting used for the film to the control unit.

Preferably, the control unit comprises a microprocessor. In one example, the microprocessor is arranged to receive the identification signal indicative of the ISO rating setting used for the film and/or individual exposures (captured images) and retrieve an appropriate development time from a look-up table of stored development time values.

Preferably, the processing system is a single-chamber processing system in which the control unit is arranged to control the system such that, in use, after the development time elapses, the developer is removed from the processing chamber and a subsequent processing fluid, such as a bleaching agent, is provided to said chamber.

According to a third aspect of the present invention, there is provided a method of photographic processing, comprising the step of identifying an ISO rating setting used for a film to be processed from stored data, such as magnetically stored data, on the film. The film is provided to a developer stage of a photographic processing system. The development time for the film is controlled, automatically in dependence on the identified ISO rating setting used for the film or individual exposures within the film.

Preferably, the step of identifying an ISO rating setting used for a film to be processed comprises the steps of identifying an ISO rating setting used for each image captured on the film and calculating an average ISO rating setting for the film in dependence on the ISO rating setting identified for each of the captured images.

Preferably, the method further comprises, after the film has been developed the steps of, digitally scanning the developed film and printing an output image.

More preferably, the process image quality is further enhanced through knowledge of film type, identified ISO rating setting and process (e.g. development) time used. Algorithms used to adjust digital file data for contrast, brightness and colour factors may include terms to take into account the variations in these factors resulting from variation in the process (development) time given to images which have been exposed in a known variation from the normal exposure. Calculations are performed with the algorithms to optimise image quality. The calculation occurs, preferably, within an output (e.g. printing) device associated with the digital scanning operation.

In an alternative example, scanning of individual images may be optimized in similar flexible mode according to the information, magnetically stored during image capture.

Advantageous Effect of the Invention

The invention provides a camera that is adapted to allow a user to select and set a required ISO rating setting for each film or each image captured. This in turn ensures that when the film is developed in a photographic processing system, the quality of output images may be optimised. In particular, by allowing a user to vary the ISO rating setting of a captured image and also ensuring that this information is stored and used during development, a customised development time can be selected automatically for each film processed, and optimised printing is provided. This ensures that the maximum possible image quality is obtained for the output images obtained from the developed film.

BRIEF DESCRIPTION OF THE DRAWINGS

Examples of the present invention will now be described with reference to the accompanying drawings, in which:

FIG. 1 shows a first example of a photographic processing system according to the present invention;

FIG. 2 shows an example of a camera according to the present invention;

FIG. 3 shows a second example of a photographic processing system according to the present invention.

DETAILED DESCRIPTION OF THE INVENTION

Figure 4:
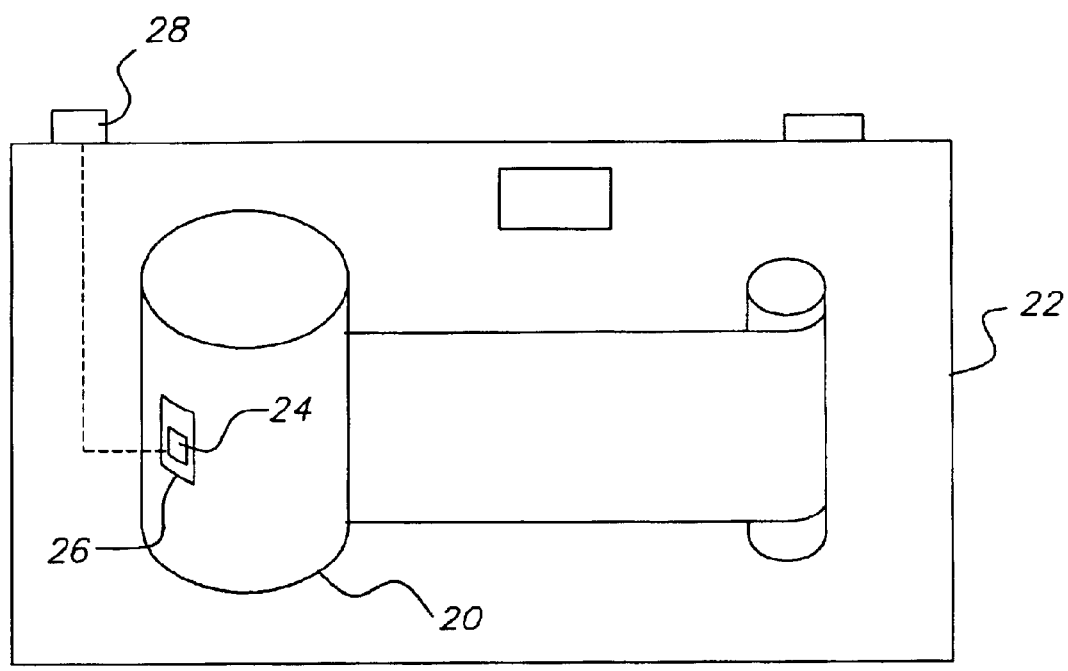
FIG. 4 shows a schematic representation of a camera according to the present invention.

FIG. 1 shows a first example of a photographic processing system according to the present invention. The processing system 2 has a developer stage 4 to receive and develop exposed film 6, a bleach stage 7 and a fixer stage 8 to receive developed film. After film has been fixed in the fixer stage 8, it is coupled to a wash stage 10 for washing and then on to a dryer (not shown). A control system 11 is provided including a magnetic reader 12 and a control unit 14 coupled to the magnetic reader 12. The magnetic reader 12 is arranged to read magnetic information stored on the film 6 to be processed and couple the information to the control unit 14. The control unit 14 receives the information, identifies the average ISO rating setting at which the film was used from the received information and provides a control signal to the developer stage 4 to control the development time of the film in dependence on the identified ISO rating setting. In this example, adjusting the speed at which the film 6 passes through the developer stage 4 controls the development time. Alternatively, the path length through the developer stage 4 may be adjusted with the use of, for example, moveable path-defining rollers within the developer stage 4.

In the case of a single chamber processing system such as that described in U.S. Patent Application Publication No. 2002/0061195 the extension of the development time is achieved by delaying the removal of developer from the chamber and the addition of bleach to the chamber. Shortening of the development time is achieved by removing developer from the chamber earlier than would usually be done.

The present invention provides a system which is capable of changing the development time for a particular film in dependence on ISO rating setting information stored, for example, magnetically on the film at the time the film was used and images were captured. For example, if a film is rated at ISO 100, for a development time of 195 seconds, as in C-41, but a user finds that a higher speed setting is required, the present invention enables the user to set the ISO of the camera exposure system as though the film were of higher speed, say ISO 400. This information is recorded magnetically on the film. When the film is processed, the processing system reads the magnetic information and adjusts the development time to a new longer value, thereby optimizing image quality for the exposures given. As will be explained below, the development time adjustment may be controlled using software.

FIG. 2 shows an example of a camera according to the present invention. The camera has all conventional aspects associated with cameras but in addition has ISO rating selection means 16, in this case a dial. Other examples of ISO rating selection means include slide switches or any other device capable of providing a selection function. The camera is adapted to be capable of writing magnetic information onto a film in use in the camera relating to the desired ISO rating setting for a particular image, thereby allowing a user ISO rating setting control.

Any suitable method or display may be used to communicate the necessary ISO rating setting options to a user. For example, it may be done via symbols indicative of the ambient surroundings e.g. sun, clouds etc, or alternatively it may be done via numbers depending on the cost and sophistication of the camera and the potential users preferences for knowledgeable control.

In an alternative example of the present invention, the camera is arranged to automatically adjust the ISO rating setting according to surrounding conditions. For example, a film of nominal rating of ISO 100 is inserted into the camera of the present invention. In normal lighting conditions and for normal snapshots, the exposure will be made according to ISO 100 needs for optimum exposure. However, should the lighting be poor and focus is beyond the flash range, the camera is arranged to increase automatically the ISO rating setting to assure a reasonable shutter speed/aperture combination. Alternatively, in circumstances of good lighting but where the user realizes that the shot being captured is an action shot, the user selects an ACTION MODE on the camera which then causes the camera to use a faster shutter speed and adjust the ISO rating information written onto the film accordingly. In other words, the camera deliberately underexposes the scene up to predetermined limits. In this way separate frames are given a significant range of under exposure. The information about the ISO rating setting used for each particular captured image is written and stored magnetically on the film.

In either of the examples described above, the film for processing now contains magnetically stored information relating to actual exposure levels which information is read prior to film development. As the film enters the photographic processing system shown in FIG. 1 or 3, prior to development the stored magnetic data is read from the film. If a simple whole-film under- or over-exposure is detected, a simple push-process is given. Alternatively, if a different under- or over-exposure is detected for each image on the film, an average ISO value is calculated and the most appropriate development time is selected for the whole film. In both cases, once the film is processed i.e. developed, and/or fixed and/or washed, the processed film is scanned and printed. Preferably, the film may be digitally printed at this stage.

As the film is printed, the magnetic information determined prior to development is preferably used by printer algorithms to adjust the scanned digital file to correct for the known response of the film to under- or over-exposure and development time. This may be done on an image by image basis. In other words, information stored magnetically during capture of the image relating to the ISO rating setting of that image is used to control the digital scanning of the image during printing. Knowledge of the exposure and process conditions (e.g. development time) is used to obtain optimized image quality. This is possible because the information stored magnetically during image capture is used to determine the process conditions (e.g. development time) of the film.

Since the magnetic information is read before scanning, the scanning parameters, as well as development time, may also be optimized for better image quality. A further advantage of the present invention is that by reading the magnetic information before film processing, the magnetic readers are not rendered unreliable through accumulated processing deposits.

FIG. 3 shows a second example of a photographic processing system according to the present invention. In this case the processing system is a single chamber processing system such as the system described in U.S. Patent Application Publication No. 2002/0061195. The system has a processing chamber 18 in the form of a cylindrical rotating tank in which a roller urges a wave of chemicals over the surface of a film being processed as the cylindrical tank rotates. The development time is controlled by software, which, in dependence on the identified ISO rating setting of the film being processed, determines when to remove developer from the processing chamber 18 and replace it with the next chemistry such as a bleaching agent. The system has a magnetic data reader 12 coupled to a control unit 14 such as a microprocessor. The control unit 14 is arranged to identify the ISO rating setting at which the film was used and from this calculate a suitable development time for the film in the processing chamber 18 of the system.

In one example of the present invention, as well as or instead of coupling information directly to a film in use in the camera, information is coupled to the housing of the film. FIG. 4 shows a schematic representation of such an example. A film cartridge 20 is shown schematically within a camera 22. A writer 24, such as a magnetic writer or electronic writer is arranged to communicate with a contact 26 positioned on the film cartridge 20. A user operable switch 28 is provided on the camera to enable a user to select a desired ISO rating setting for a particular image.

Once a desired ISO rating setting for a particular image is selected, information relating to the ISO rating setting is written by the writer 24 to a memory unit associated with the contact 26. In this example, the information is stored within the memory unit associated with the contact 26, the memory unit also being arranged on the film cartridge 20. As in the examples above, the control unit 14 within a suitably configured processing system is arranged to calculate a suitable development time for the film in the processing (developing) chamber of the system in dependence on the ISO rating settings at which images on the film were captured.

The invention has been described in detail with particular reference to certain embodiments thereof, but it will be understood that variations and modifications can be effected within the spirit and scope of the invention.

What is claimed is:

1. A photographic processing system comprising:

reading means to identify from magnetic information stored on a film to be processed the ISO rating setting at which images on the film were captured;

a developer stage to receive the film to be developed; and a control unit to select a development time for the film in dependence on the identified ISO rating setting.

2. A system according to claim 1, in which the reading means comprises a magnetic detector to read the magnetic information stored on the film and provide an identification signal indicative of the ISO rating setting used for the film to the control unit.

3. A system according to claim 2, in which the control unit comprises a microprocessor.

4. A system according to claim 3, in which the microprocessor is arranged to receive the identification signal indicative of the ISO rating setting used for the film and retrieve an appropriate development time from a look-up table of stored development time values.

5. A system according to claim 1, in which the system is a single-chamber processing system and in which the control unit is arranged to control the system such that, in use, after the development time elapses, the developer is removed from the processing chamber and a subsequent processing fluid is provided to said chamber.

6. A method of photographic processing, comprising the steps of:

identifying an ISO rating setting used for a film to be processed from stored magnetic information on the film;

providing the film to a developer stage of a photographic processing system; and automatically controlling the development time for the film in dependence on the identified ISO rating setting.

7. A method according to claim 6, in which the step of identifying an ISO rating for a film to be processed comprises the steps of:

identifying an ISO rating setting for each image captured on the film; and calculating an average ISO rating setting for the film in dependence on the ISO ratings identified for each of the captured images.

8. A method according to claim 6, further comprising the steps of:

after the film has been developed, digitally scanning the developed film and printing an output image.

9. A method according to claim 8, in which the digital scanning is controlled in accordance with exposure and development conditions.

10. A method according to claim 8, in which the output image is digitally printed.

11. A method according to claim 8, in which the file obtained from the digital scanning of the developed film is adjusted with the use of a printing algorithm, the printing algorithm being optimized in dependence on the identified ISO rating setting.

12. A method of photographic processing, comprising the steps of:
- identifying an ISO rating setting used for a film to be processed from stored data on the film;
- providing the film to a developer stage of a photographic processing system; and
- automatically controlling the development time for the film in dependence on the identified ISO rating setting.

13. A photographic processing system comprising:
- reading means to identify from data stored on a film to be processed the ISO rating setting at which images on the film were captured;
- a developer stage to receive the film to be developed; and
- a control unit to select a development time for the film in dependence on the identified ISO rating setting.

14. A system according to claim 13, further comprising:
- a digital printing device including a scanner to scan the developed film and a printing an output format of images captured on the film; and
- transfer means for transferring data identified from the film to the digital printing device to enable optimization of scanning and printing.

* * * * *

UNITED STATES PATENT AND TRADEMARK OFFICE
CERTIFICATE OF CORRECTION

PATENT NO. : 6,749,350 B2
DATED : June 15, 2004
INVENTOR(S) : Henry H. Adam

It is certified that error appears in the above-identified patent and that said Letters Patent is hereby corrected as shown below:

Column 8,
Line 6, after "and a" insert -- printer for --

Signed and Sealed this

Twelfth Day of April, 2005

JON W. DUDAS
*Director of the United States Patent and Trademark Office*